US012539464B2

(12) United States Patent
Lei et al.

(10) Patent No.: US 12,539,464 B2
(45) Date of Patent: Feb. 3, 2026

(54) GAME DISPLAY METHOD, DEVICE, ELECTRONIC EQUIPMENT AND STORAGE MEDIUM

(71) Applicant: NETEASE (HANGZHOU) NETWORK CO., LTD., Zhejiang (CN)

(72) Inventors: Yuewen Lei, Hangzhou (CN); Zijing Wang, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 140 days.

(21) Appl. No.: 18/548,495

(22) PCT Filed: Mar. 25, 2022

(86) PCT No.: PCT/CN2022/083179

§ 371 (c)(1),
(2) Date: Aug. 30, 2023

(87) PCT Pub. No.: WO2022/267589

PCT Pub. Date: Dec. 29, 2022

(65) Prior Publication Data

US 2024/0139627 A1 May 2, 2024

(30) Foreign Application Priority Data

Jun. 25, 2021 (CN) ......................... 202110713555.0

(51) Int. Cl.
*A63F 13/5375* (2014.01)
*A63F 13/5378* (2014.01)

(52) U.S. Cl.
CPC ...... *A63F 13/5375* (2014.09); *A63F 13/5378* (2014.09); *A63F 2300/308* (2013.01)

(58) Field of Classification Search
CPC .............. A63F 13/5375; A63F 13/5378; A63F 2300/308
(Continued)

(56) References Cited

U.S. PATENT DOCUMENTS 10,807,001 B2 * 10/2020 Ge ........................ A63F 13/537
10,994,204 B1 * 5/2021 Tokuda ................. A63F 13/822
(Continued)

FOREIGN PATENT DOCUMENTS

CN 104415536 A 3/2015
CN 109173254 A 1/2019
(Continued)

OTHER PUBLICATIONS

English translation of the International Search Report issued by the International Search Authority of China on Jun. 24, 2022 in connection with International Application No. PCT/CN2022/083179, 3 pages.

(Continued)

*Primary Examiner* — Allen Chan
(74) *Attorney, Agent, or Firm* — BCF LLP

(57) ABSTRACT

A game display method and device, electronic equipment and a storage medium are provided. The method includes: displaying a game interface corresponding to a first virtual object; in response to a preset game event, acquiring clue information of a second virtual object in a game scene, and updating the current suspicion value of at least one second virtual object, wherein the clue information is information generated in response to a first target interactive operation performed by the second virtual object on a target object in the game scene; acquiring location information of the second virtual object with the current suspicion value satisfying a target threshold range in the game scene; and displaying,
(Continued)

on a game scene map in the game interface, a mark corresponding to the location information.

20 Claims, 2 Drawing Sheets

(58) Field of Classification Search
USPC ............................................................ 463/31
See application file for complete search history.

(56) References Cited

U.S. PATENT DOCUMENTS

| | | | | |
|---|---|---|---|---|
| 11,013,999 | B2 * | 5/2021 | Kusakihara | G06F 3/04815 |
| 11,395,967 | B2 * | 7/2022 | Fung | A63F 13/92 |

FOREIGN PATENT DOCUMENTS

| | | | |
|---|---|---|---|
| CN | 110090444 | A | 8/2019 |
| CN | 111265869 | A | 6/2020 |
| CN | 112717401 | A | 4/2021 |
| CN | 113457133 | A | 10/2021 |
| JP | 2010246851 | A | 11/2010 |

OTHER PUBLICATIONS

International Search Report issued by the International Search Authority of China on Jun. 24, 2022 in connection with International Application No. PCT/CN2022/083179, 3 pages.

Written Opinion issued by the International Search Authority of China in connection with International Application No. PCT/CN2022/083179, 4 pages.

* cited by examiner

GAME DISPLAY METHOD, DEVICE, ELECTRONIC EQUIPMENT AND STORAGE MEDIUM

CROSS REFERENCE TO RELATED APPLICATIONS

The present disclosure is the U.S. National Stage Application of PCT International Application No. PCT/CN2022/083179, filed on Mar. 25, 2022, which is based upon and claims the priority to the Chinese patent application with the filing No. 202110713555.0, filed on Jun. 25, 2021, and entitled "Game Display Method, Device, Electronic Equipment, and Storage Medium", the entire contents of both of which are incorporated herein by reference for all purposes.

TECHNICAL FIELD

The present disclosure relates to the technical field of games, and in particular, to a game display method, device, electronic equipment, and storage medium.

BACKGROUND

As one type of games, the stealth adversarial game is popular with many players. In a stealth adversarial game, a player usually can choose a role of an attacking party or a defending party, the attacking party players are responsible for sneaking into a target site, completing a designated task, and successfully evacuating, and the defending party is generally responsible for collecting clues of the attacking party players and pursuing and capturing the attacking party players.

In most relevant stealth adversarial games, in order to facilitate interaction of players of the same camp in the games, a map is usually set, the attacking party players can learn positions of all the attacking party players through the map, and the defending party players also can learn positions of all the defending party players through the map.

Therefore, in the relevant stealth adversarial games, the defending party players have no way to view the positions of the attacking party players through the map, so that the defending party players have bad game experience.

SUMMARY

In some embodiments, the present disclosure provides a game display method, including displaying, by a terminal, a game interface corresponding to a first virtual object, where a game includes a game scene, and the first virtual object having a first identity and at least one second virtual object having a second identity that are located in the game scene, the first virtual object and the at least one second virtual object are located in the same match, the second identity is an identity opposite to the first identity; acquiring, in response to a preset game event, clue information related to the second virtual object in the game scene, and updating a current suspicion value of the at least one second virtual object, where the clue information is information generated in response to a first target interactive operation performed by the second virtual object on a target object in the game scene, and the target object is at least one of: the second virtual object, a non-player character, and a virtual article in the game scene; acquiring location information of the second virtual object with the current suspicion value satisfying a target threshold range in the game scene; and displaying a mark corresponding to the location information on a game scene map in the game interface.

In some embodiments, the present disclosure provides electronic equipment, including: a processor, a storage medium, and a bus, where the storage medium stores machine-readable instructions executable by the processor, and when the electronic equipment is running, the processor is in communication with the storage medium via the bus, and the processor executes the machine-readable instructions, so as to execute steps of a game display method, where the method includes displaying a game interface corresponding to a first virtual object, where a game includes a game scene, and the first virtual object having a first identity and at least one second virtual object having a second identity that are located in the game scene, the first virtual object and the at least one second virtual object are located in the same match, the second identity is an identity opposite to the first identity; acquiring, in response to a preset game event, clue information related to the second virtual object in the game scene, and updating a current suspicion value of the at least one second virtual object, where the clue information is information generated in response to a first target interactive operation performed by the second virtual object on a target object in the game scene, and the target object is at least one of: the second virtual object, a non-player character, and a virtual article in the game scene; acquiring location information of the second virtual object with the current suspicion value satisfying a target threshold range in the game scene; and displaying a mark corresponding to the location information on a game scene map in the game interface.

In some embodiments, the present disclosure provides a non-volatile computer-readable storage medium, where the non-volatile storage medium stores a computer program, and when the computer program is executed by a processor, steps of a game display method are executed, where the method includes displaying a game interface corresponding to a first virtual object, where a game includes a game scene, and the first virtual object having a first identity and at least one second virtual object having a second identity that are located in the game scene, the first virtual object and the at least one second virtual object are located in the same match, the second identity is an identity opposite to the first identity; acquiring, in response to a preset game event, clue information related to the second virtual object in the game scene, and updating a current suspicion value of the at least one second virtual object, where the clue information is information generated in response to a first target interactive operation performed by the second virtual object on a target object in the game scene, and the target object is at least one of: the second virtual object, a non-player character, and a virtual article in the game scene; acquiring location information of the second virtual object with the current suspicion value satisfying a target threshold range in the game scene; and displaying a mark corresponding to the location information on a game scene map in the game interface.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these drawings, without using any inventive efforts.

DETAILED DESCRIPTION

Figure 1:
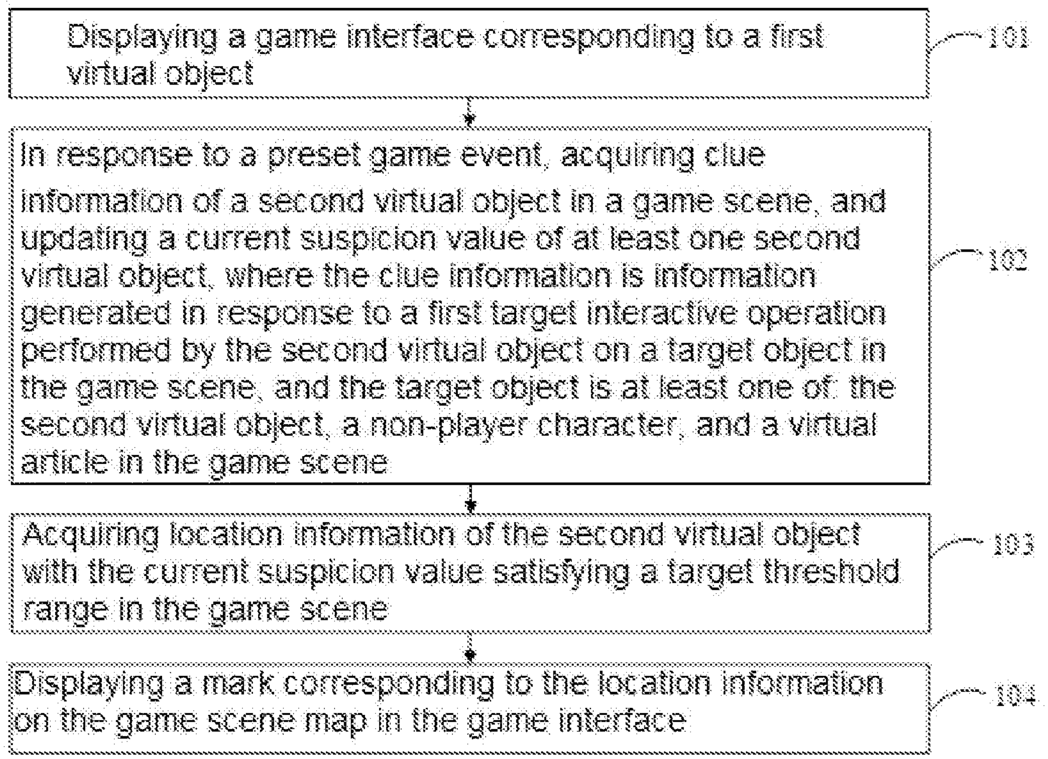
FIG. 1 is a flow diagram of a game display method provided in an embodiment of the present disclosure.

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and it should be understood that the accompanying drawings in the present disclosure are merely for the illustrative and descriptive purpose, rather than limiting the scope of protection of the present disclosure. Besides, it should be understood that the schematic drawings are not drawn to scale. The flowcharts used in the present disclosure show operations implemented according to some embodiments of the present disclosure. It should be understood that the operations of the flowcharts may be implemented out of order, and steps without logical context may be reversed in order or simultaneously implemented. In addition, one skilled in the art, under the guidance of the present disclosure, could add one or more other operations to the flowcharts, or remove one or more operations from the flowcharts.

Besides, some but not all embodiments of the present disclosure are described. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope of the present disclosure claimed, but merely illustrates chosen embodiments of the present disclosure. All of other embodiments obtained by a person skilled in the art based on the embodiments of the present disclosure without using creative efforts shall fall within the scope of protection of the present disclosure.

It should be noted that the term “include” will be used in the embodiments of the present disclosure to indicate the existence of features specified thereafter, but not to exclude adding other features.

Before the present disclosure is explained in detail, an application scenario of the present disclosure will be introduced first.

The stealth adversarial game is a type of game that is quite popular with players. In the stealth adversarial game, a player usually may choose to play a role of an attacking party or a defending party, and in the game, the attacking party is responsible for sneaking into a target site, completing a designated task, and successfully evacuating, and the defending party is responsible for collecting clue information of the attacking party players and pursuing and capturing the attacking party players. In most stealth adversarial games, in order to facilitate interaction of players of the same camp in the games, a map is usually set, the attacking party players may learn positions of all the attacking party players in the map through the map, and the defending party players also may learn positions of all the defending party players in the map through the map. However, in relevant stealth adversarial games, the defending party usually takes the initiative, and the defending party players have no way to view the positions of the attacking party players through the map, so that the defending party players have bad game experience, the game competitiveness is relatively low, and the participation degree of player is not high.

The present disclosure provides a game display method, where the game includes a game scene, and a first virtual object having a first identity and at least one second virtual object having a second identity that are located in the game scene, the first virtual object and the second virtual object are located in the same match, and the second identity is an identity opposite to the first identity. The method includes: displaying a game interface corresponding to the first virtual object; in response to a preset game event, acquiring clue information of the second virtual object in the game scene, and updating a current suspicion value of at least one second virtual object, where the clue information is information generated in response to a first target interactive operation performed by the second virtual object on a target object in the game scene, and the target object is at least one of: the second virtual object, a non-player character, and a virtual article in the game scene; acquiring location information of the second virtual object with the current suspicion value satisfying a target threshold range in the game scene; and displaying a mark corresponding to the location information on a game scene map in the game interface. The game display method provided in the present disclosure provides the defending party players with a way of viewing the positions of the attacking party players through the map, which is beneficial to improving the game experience of the defending party players, and also facilitates improving the game competitiveness and the degree of game participation of the players.

The game display method in an embodiment of the present disclosure may run on a terminal or a server. In the above, the terminal may be a local terminal. When the game display method runs on a server, this method may be realized and executed based on a cloud interaction system, where the cloud interaction system includes the server and a client device.

In some examples, the cloud interaction system may run various cloud applications, for example, a cloud game. Taking the cloud game as an example, the cloud game refers to a cloud computing-based game mode. In a running mode of the cloud game, a running subject of a game program and a game screen presentation subject are separated, storage and running of the game display method are completed on a cloud game server, a client device functions to receive and transmit data and present the game screen, for example, the client device may be a display device with a data transmission function close to a user side, e.g., a mobile terminal, a television, a computer, a handheld computer, etc. However, the terminal that performs information processing is the cloud game server in the cloud. When playing, the player operates the client device to send an operation instruction to the cloud game server, the cloud game server runs the game according to the operation instruction, encodes and compresses data such as the game screen, and returns the same to the client device via network, and finally, the client device decodes the data and outputs the game screen.

In some examples, the terminal may be a local terminal. Taking a game as an example, the local terminal stores a game program and is configured to present a game screen. The local terminal is configured to interact with a player via a graphical user interface, i.e., conventionally downloading and installing the game program and running the same through electronic equipment. The local terminal may provide the graphical user interface to the player in various manners, for example, the graphical user interface may be rendered on a display screen of the terminal, or may be provided to the player by means of holographical projection. For example, the local terminal may include a display screen and a processor, where the display screen is configured to present the graphical user interface, the graphical user interface includes the game screen, and the processor is configured to run the game, generate the graphical user interface, and control the display of the graphical user interface on the display screen.

In some embodiments, an example of the present disclosure provides a game display method, and the graphical user interface is provided by a terminal, where the terminal may be the local terminal mentioned in the preceding, and also may be the client device in the cloud interaction system mentioned in the preceding.

Referring to FIG. 1, FIG. 1 is a flow diagram of the game display method provided in an embodiment of the present disclosure. It should be noted that the game display method provided in the present disclosure is not limited to the specific order in FIG. 1 or described below. It should be understood that in other embodiments, the order of some steps in the game display method provided in the present disclosure may be exchanged with each other according to actual needs, or some steps thereof may be omitted or deleted.

Besides, the game in the embodiments of the present disclosure includes a game scene, and a first virtual object having a first identity and at least one second virtual object having a second identity located in the game scene, the first virtual object and the second virtual object are located in the same match, and the second identity is an identity opposite to the first identity.

In the above, the game scene may be a three-dimensional scene or a two-dimensional scene, and the first virtual object and the second virtual object may be virtual characters drawn according to actual needs, and also may be other virtual animation characters, which are not limited in the present disclosure.

The second identity is an identity opposite to the first identity, i.e., in the game, a game target of the first virtual object having the first identity is to prevent the second virtual object having the second identity from completing a game target of the second identity, or the game target of the second virtual object having the second identity is to complete the game target of the first identity after preventing the first virtual object having the first identity.

In the embodiments of the present disclosure, the first identity is defending party, and the second identity is attacking party, that is, the identity of the first virtual object is the defending party, the identity of the second virtual object is the attacking party, and the first virtual object having the attacking party identity and the virtual object having the defending party identity are in the game scene of the same match, the game target of the virtual object having the defending party identity is to prevent the virtual object having the attacking party identity from completing the game target of the attacking party. The game target of the attacking party may be sneaking into a target site, completing a designated task, and successfully evacuating, or may be occupying a preset number of strongholds in the game, which is not limited in the present disclosure.

The flow shown in FIG. 1 will be described in detail below.

S101: displaying a game interface corresponding to the first virtual object.

In some examples, each first virtual object having the first identity is corresponding to one player, and a game interface corresponding to the first virtual objects may be displayed for players corresponding to the first virtual objects.

In some examples, the game interface corresponding to the first virtual object is displayed in the game scene where the first virtual object is located. In this way, the player controlling the first virtual object may conveniently and quickly view information displayed in the game interface or interact with the game, facilitating improving the game experience of the player.

In some embodiments, the game interface may include a plurality of operation controls, and the player may control acts of the first virtual object in the game by operating the operation controls. For example, the player may control the first virtual object to move, adjust directions, etc., in the game scene by controlling a move operation control, control the first virtual object to jump, climb, etc., in the game scene by clicking a jump operation control, control the first virtual object to release a skill in the game scene by clicking or touching a skill operation control, control the first virtual object to make an attack action in the game scene by clicking or long pressing an attack operation control, control the first virtual object to make a defense action in the game scene by clicking or long pressing a defense operation control, and control the first virtual object to acquire the clue information of the second virtual object in the game scene by clicking a clue collecting control, etc. Without doubt, the description herein is merely exemplary, and the game interface further may include therein other operation controls, which is not limited in the present disclosure.

S102: in response to the preset game event, acquiring the clue information of the second virtual object in the game scene, and updating the current suspicion value of at least one second virtual object, where the clue information is information generated in response to the first target interactive operation performed by the second virtual object on the target object in the game scene, and the target object is at least one of: the second virtual object, the non-player character, and the virtual article in the game scene.

The preset game event may be an event set according to actual needs, and in the present embodiment, the preset game event is that the first virtual object controlled by a current client performs a preset act operation on the target object in the game scene. For example, the first virtual object performs a rescue operation on the non-player character in the game scene, and for another example, the first virtual object performs a closing operation on the virtual article in the game scene, such as a password device, and for a further example, the first virtual object receives information sent after the second virtual object in the game scene completes a part of the game target.

In some examples, the first virtual objects do not share between themselves the clue information of the second virtual object respectively acquired or the updated current suspicion value.

In some examples, the first virtual objects share between themselves the clue information of the second virtual object respectively acquired and/or the updated current suspicion value. In some examples, a first virtual object A does not acquire the clue information of a second virtual object A, but a first virtual object B in the same team as the first virtual object A acquires the clue information of the second virtual object A during the process of the game, then the first virtual object A will get the current suspicion value of the second virtual object A updated according to the first virtual object B.

In some examples, the target object also may be a place where the second virtual object makes an illegal act in the game scene, and the first target interactive operation may be an operation of using a skill. Legal and illegal acts of the second virtual object in the game may be preset for the game. If the second virtual object makes an illegal act at a certain place in the game scene, the clue information will be left at this position, and only after the first virtual object uses a preset skill at this position, may the clue information be displayed. The first virtual object may collect the clue information, and after the collection, the current suspicion value of the second virtual object will be updated. For example, the current suspicion value of the second virtual object is initially zero, at a first place in the game scene, the second virtual object makes an illegal act of attacking the non-player character, and leaves the clue information at the first place, when the first virtual object uses the skill "explore" at the first place, the clue information is displayed in a form of ghost shadow, the first virtual object may collect the ghost shadow, i.e., collect the clue information, and after the collection, the current suspicion value of the second virtual object will be increased. Without doubt, the description herein is merely exemplary, and the present disclosure is not limited thereto.

It should be particularly noted that, after the clue information of the second virtual object in the game scene is acquired in response to the preset game event, not only the current suspicion value of the second virtual object corresponding to the preset game event may be updated, but also the current suspicion values of all the second virtual objects may be updated, which is not limited in the present disclosure.

S103: acquiring location information of the second virtual object with the current suspicion value satisfying the target threshold range in the game scene.

In some examples, the target threshold range may be set for the current suspicion value of the second virtual object in advance, and when the current suspicion value of the second virtual object satisfies the target threshold range, the location information of the second virtual object in the game scene is acquired. The target threshold range may be set according to actual needs, which is not limited in the present disclosure.

It should be specially noted that the location information may be position information of the second virtual object in the game scene, for example, coordinate information or position point information of the second virtual object in the game scene.

S104: displaying a mark corresponding to the location information on the game scene map in the game interface.

It should be noted that, the game scene map in the game interface herein refers to the game scene map in the game interface corresponding to the first virtual object, i.e., the game scene map that may be seen by the player controlling the first virtual object, and the location information refers to location information of the second virtual object in the game scene. That is to say, in the embodiments of the present disclosure, if the suspicion value of the second virtual object satisfies the target threshold range, the game scene map in the game interface of the first virtual object displays the location information of the second virtual object in the game scene, thus providing the first virtual object having the first identity with a way of viewing the location information of the second virtual object having the second identity in the game scene map, which is beneficial to the game experience of the player controlling the first virtual object, and also facilitates improving the game competitiveness and the degree of game participation of the players.

In the embodiments of the present disclosure, the location information refers to location information of the second virtual object in the game scene, and the mark corresponding to the location information is displayed on the game scene map in the game interface, i.e., mapping the location information of the second virtual object in the game scene onto the game scene map in the game interface, and displaying the corresponding mark at a corresponding position on the game scene map, so as to provide the player controlling the first virtual object with a way of viewing the location information of the second virtual object.

The game display method provided in the present disclosure provides the defending party player a way of viewing the position of the attacking party player through the map, may improve the game experience of the defending party player, and meanwhile improve the game competitiveness and the game participation degree of player.

In some examples, before the step of acquiring location information of the second virtual object with the current suspicion value satisfying a target threshold range in the game scene, the method further includes: determining the target threshold range to be satisfied by the current suspicion value; and the step of displaying a mark corresponding to the location information on a game scene map in the game interface is: displaying the mark corresponding to the location information on the game scene map in the game interface in a display mode corresponding to the target threshold range.

In some examples, the current suspicion value refers to the current suspicion value of the second virtual object, and the target threshold range may be set for the current suspicion value of the second virtual object in advance. For a certain second virtual object, the target threshold range to be satisfied by the current suspicion value thereof may be determined first, then location information of the second virtual object with the current suspicion value satisfying the target threshold range in the game scene is acquired, and finally the mark corresponding to the location information is displayed on the game scene map in the game interface in the display mode corresponding to the target threshold range.

In the embodiments of the present disclosure, different ranges in the target threshold range may be corresponding to different display modes. The target threshold range may be divided into a plurality of sub-target threshold ranges in advance, and each sub-target threshold range is corresponding to one display mode. This is not limited in the present disclosure.

In some examples, the target threshold range includes at least two sub-target threshold ranges, and the method includes: determining a current sub-target threshold range where the current suspicion value is located; and the step of displaying the mark corresponding to the location information on the game scene map in the game interface in a display mode corresponding to the target threshold range includes: displaying the mark corresponding to the location information on the game scene map in the game interface in a display mode corresponding to the current sub-target threshold range.

In some examples, the target threshold range may be divided into a plurality of sub-target threshold ranges in advance, and each sub-target threshold range is corresponding to one display mode. For example, the display mode corresponding to a range with smaller sub-target threshold is that only the mark obscurely corresponding to the location information is displayed on the game scene map in the game interface, that is, the position of the mark on the game scene map is obscurely corresponding to the location information, and the player controlling the first virtual object cannot acquire an accurate position of the corresponding second virtual object from the mark; and the display mode corresponding to a range with larger sub-target threshold is that the mark accurately corresponding to the location information is displayed on the game scene map in the game interface, and the player controlling the first virtual object may acquire the accurate position of the corresponding second virtual object from the mark. Of course, the description herein is merely exemplary, and the present disclosure is not limited thereto.

In some examples, in a specific embodiment, if the current sub-target threshold range is a first sub-target threshold range, the step of displaying the mark corresponding to the location information on the game scene map in the game interface in a display mode corresponding to the current sub-target threshold range includes: displaying the mark corresponding to the location information on the game scene map in the game interface in a display mode of heat map.

In some examples, the first sub-target threshold range may be the range with smaller sub-target threshold of two sub-target threshold ranges included by the target threshold range.

In the embodiments of the present disclosure, if the current sub-target threshold range where the current suspicion value is located is the first sub-target threshold range, the mark corresponding to the location information is displayed on the game scene map in the game interface of the first virtual object in the display mode of heat map, that is, a position corresponding to the location information on the game scene map is determined first, and then the position is displayed after a layer of preset color is superposed on a preset range around this position, where the preset color may be purple or red with certain transparency, which is not limited in the present disclosure.

Figure 2:
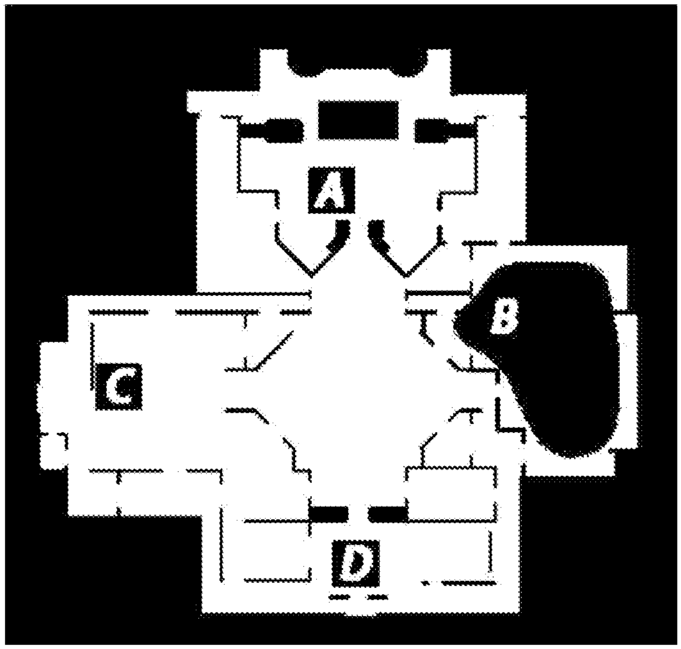
FIG. 2 is a schematic diagram of a display mode of heat map provided in an embodiment of the present disclosure.

Referring to FIG. 2, in some examples, displaying the mark corresponding to the location information on the game scene map in the game interface in a display mode of heat map includes: determining an area corresponding to the location information on the game scene map, where the area corresponding to the location information is one of a plurality of areas divided in advance on the game scene map; and with the area corresponding to the location information taken as a hot spot area, displaying the hot spot area on the game scene map in the game interface in the display mode of heat map.

The game scene map may be divided into a plurality of areas in advance, for example, an area A, an area B, an area C, and an area D. Firstly, the area corresponding to the location information is determined as, for example, the area B, then the area B is taken as the hot spot area, and the area B is displayed on the game scene map in the game interface of the first virtual object in the display mode of heat map, i.e., the area B is superposed with a preset color and then displayed.

In some examples, on the game scene map in the game interface, color brightness of the hot spot area is related to the number of second virtual objects with the current suspicion value satisfying the first sub-target threshold range in the hot spot area.

The color brightness in the embodiments of the present disclosure, i.e., luminance of color, is used for representing lightness and darkness and depth of color, and the brightness of the color will be increased after two layers of the same color are superposed.

In some examples, the more the number of second virtual objects with the current suspicion value satisfying the first sub-target threshold range in the hot spot area is, the higher the color brightness of the hot spot area is. For example, the area B is the hot spot area, and if there are N second virtual objects with the current suspicion value satisfying the first sub-target threshold range in the area B, the area B is superposed with N layers of preset color and then displayed. In this way, the player controlling the first virtual object may judge, according to the color brightness of the hot spot area, the number of second virtual objects with the current suspicion value satisfying the first sub-target threshold range in the hot spot area, which is beneficial to improving the game experience of the player controlling the first virtual object.

In some examples, it is also feasible to label on the hot spot area a digit used to indicate the number of second virtual objects with the current suspicion value satisfying the first sub-target threshold range in the hot spot area, which is not limited in the present disclosure.

Figure 3:
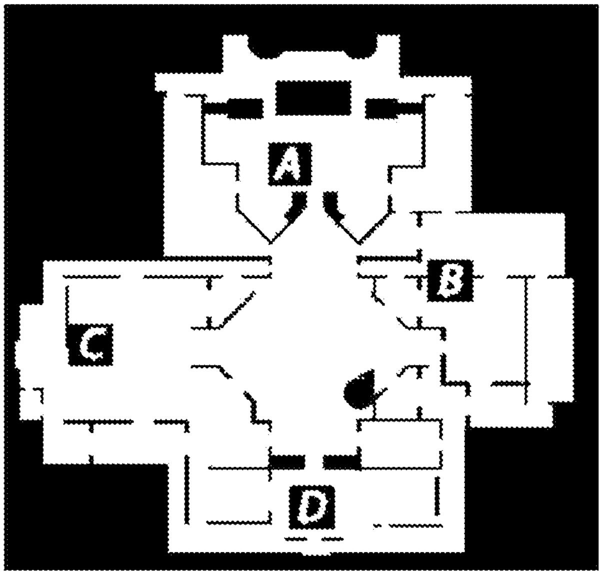
FIG. 3 is a schematic diagram of a display mode of location identifier provided in an embodiment of the present disclosure.

Referring to FIG. 3, in some examples, in a specific embodiment, if the current sub-target threshold range is a second sub-target threshold range, with a minimum value in the second sub-target threshold range being greater than a maximum value in the first sub-target threshold range, the step of displaying the mark corresponding to the location information on the game scene map in the game interface in a display mode corresponding to the current sub-target threshold range includes: displaying the mark corresponding to the location information on the game scene map in the game interface in a display mode of location identifier.

In some examples, the second sub-target threshold range may be the range with larger sub-target threshold of two sub-target threshold ranges included by the target threshold range. The location identifier may be a circle with an arrow, with the arrow pointing to a direction consistent with the orientation of the second virtual object, and also may be in other shapes, which is not limited in the present disclosure.

In some examples, displaying the mark corresponding to the location information on the game scene map in the game interface in a display mode of location identifier includes: determining a position point corresponding to the location information on the game scene map; and displaying the position point corresponding to the location information on the game scene map in the game interface in the display mode of location identifier.

In the embodiments of the present disclosure, if the current sub-target threshold range where the current suspicion value is located is the second sub-target threshold range, the mark corresponding to the location information is displayed on the game scene map in the game interface of the first virtual object in the display mode of location identifier, that is, a position point corresponding to the location information on the game scene map is determined first, and then this position point is displayed with a location identifier.

In some examples, the location identifier includes an arrow, and the arrow points to a direction consistent with orientation of the second virtual object.

In this way, the player controlling the first virtual object may learn more detailed real-time actions of the second virtual object, thus improving the game experience.

Figure 4:
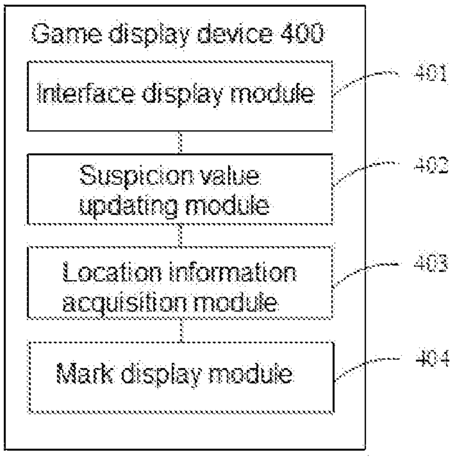
FIG. 4 is a schematic diagram of a game display device provided in an embodiment of the present disclosure.

Referring to FIG. 4, an embodiment of the present disclosure provides a game display device 400, where the game includes a game scene, and a first virtual object having a first identity and at least one second virtual object having a second identity that are located in the game scene, the first virtual object and the second virtual object are located in the same match, and the second identity is an identity opposite to the first identity. The device includes:

- an interface display module 401, configured to display a game interface corresponding to the first virtual object;
- a suspicion value updating module 402, configured to, in response to a preset game event, acquire clue information of the second virtual object in the game scene, and update a current suspicion value of at least one second virtual object, where the clue information is information generated in response to a first target interactive operation performed by the second virtual object on a target object in the game scene, and the target object is at least one of: the second virtual object, a non-player character, and a virtual article in the game scene;
- a location information acquisition module 403, configured to acquire location information of the second virtual object with the current suspicion value satisfying a target threshold range in the game scene; and
- a mark display module 404, configured to display a mark corresponding to the location information on a game scene map in the game interface.

In some examples, the device further includes: a determination module, configured to determine the target threshold range to be satisfied by the current suspicion value, where the mark display module 404 is specifically configured to display the mark corresponding to the location information on the game scene map in the game interface in a display mode corresponding to the target threshold range.

In some examples, the target threshold range includes at least two sub-target threshold ranges, and the determination module is specifically configured to determine a current sub-target threshold range where the current suspicion value is located; and the mark display module 404 is specifically configured to display the mark corresponding to the location information on the game scene map in the game interface in a display mode corresponding to the current sub-target threshold range.

In some examples, if the current sub-target threshold range is a first sub-target threshold range, the mark display module 404 is specifically configured to display the mark corresponding to the location information on the game scene map in the game interface in a display mode of heat map.

In some examples, the mark display module 404 is specifically configured to determine an area corresponding to the location information on the game scene map, where the area corresponding to the location information is one of a plurality of areas divided in advance on the game scene map; and take the area corresponding to the location information as a hot spot area, and display the hot spot area on the game scene map in the game interface in the display mode of heat map.

In some examples, on the game scene map in the game interface, color brightness of the hot spot area is related to the number of second virtual objects with the current suspicion values satisfying the first sub-target threshold range in the hot spot area.

In some examples, if the current sub-target threshold range is a second sub-target threshold range, with a minimum value in the second sub-target threshold range being greater than a maximum value in the first sub-target threshold range, the mark display module 404 is specifically configured to display the mark corresponding to the location information on the game scene map in the game interface in a display mode of location identifier.

In some examples, the mark display module 404 is specifically configured to determine a position point corresponding to the location information on the game scene map; and display the position point corresponding to the location information on the game scene map in the game interface in the display mode of location identifier.

In some examples, the location identifier includes an arrow, and the arrow points to a direction consistent with orientation of the second virtual object.

The above device is configured to execute the method provided in the foregoing embodiment, and has similar implementation principle and technical effects, which are not described herein again.

The above modules may be one or more integrated circuits configured to implement the above method, for example, one or more application specific integrated circuits (ASIC for short), or one or more digital signal processors (DSP for short), or one or more field programmable gate arrays (FPGA for short), etc. For another example, when a certain module above is implemented in the form of a processing element scheduling program code, the processing element may be a general purpose processor, for example, a central processing unit (CPU for short) or other processors that may invoke the program code. For another example, these modules may be integrated together and implemented in the form of a system-on-a-chip (SOC for short).

The above modules may be connected or in communication with each other via a wired connection or a wireless connection. The wired connection may include a metal cable, an optical cable, a hybrid cable, etc., or any combination thereof. The wireless connection may include a connection via a LAN, WAN, Bluetooth, ZigBee, NFC, or the like, or any combination thereof. Two or more modules may be combined into a single module, and any one module may be divided into two or more units. A person skilled in the art could clearly know that for the sake of convenience and conciseness of description, reference may be made to corresponding processes in the method embodiments for specific operation processes of the system and device described above, and they will not be repeated herein.

It should be noted that these above modules may be one or more integrated circuits configured to implement the above method, for example, one or more application specific integrated circuits (ASIC for short), or one or more digital signal processors (DSP for short), or one or more field programmable gate arrays (FPGA for short), etc. For another example, when a certain module above is implemented in the form of a processing element scheduling program code, the processing element may be a general purpose processor, for example, a central processing unit (CPU for short) or other processors that may invoke the program code. For another example, these modules may be integrated together and implemented in the form of a system-on-a-chip (SOC for short).

Figure 5:
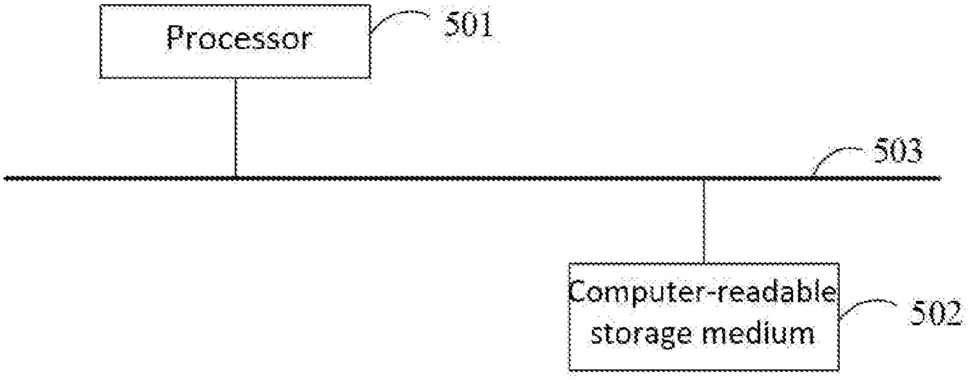
FIG. 5 is a schematic diagram of an electronic equipment provided in an embodiment of the present disclosure.

Referring to FIG. 5, an embodiment of the present disclosure provides electronic equipment 500, including: a processor 501, a storage medium 502, and a bus 503, where the storage medium 502 stores machine-readable instructions executable by the processor 501, and when the electronic equipment 500 is running, the processor 501 is in communication with the storage medium 502 via the bus 503, the processor 501 executes the machine-readable instructions, so as to execute the steps of the game display method provided by the preceding embodiments: displaying a game interface corresponding to a first virtual object;

in response to a preset game event, acquiring clue information of a second virtual object in a game scene, and updating a current suspicion value of at least one second virtual object, where the clue information is information generated in response to a first target interactive operation performed by the second virtual object on a target object in the game scene, and the target object is at least one of: the second virtual object, a non-player character, and a virtual article in the game scene;

acquiring location information of the second virtual object with the current suspicion value satisfying a target threshold range in the game scene; and displaying a mark corresponding to the location information on a game scene map in the game interface.

In some examples, before the step of acquiring location information of the second virtual object with the current suspicion value satisfying a target threshold range in the game scene, the method further includes: determining the target threshold range to be satisfied by the current suspicion value;

the step of displaying a mark corresponding to the location information on a game scene map in the game interface is:

displaying the mark corresponding to the location information on the game scene map in the game interface in a display mode corresponding to the target threshold range.

In some examples, the target threshold range includes at least two sub-target threshold ranges, and the method includes: determining a current sub-target threshold range where the current suspicion value is located; and the step of displaying the mark corresponding to the location information on the game scene map in the game interface in a display mode corresponding to the target threshold range includes: displaying the mark corresponding to the location information on the game scene map in the game interface in a display mode corresponding to the current sub-target threshold range.

In some examples, if the current sub-target threshold range is a first sub-target threshold range, the step of displaying the mark corresponding to the location information on the game scene map in the game interface in a display mode corresponding to the current sub-target threshold range includes:

displaying the mark corresponding to the location information on the game scene map in the game interface in a display mode of heat map.

In some examples, displaying the mark corresponding to the location information on the game scene map in the game interface in a display mode of heat map includes:

determining an area corresponding to the location information on the game scene map, where the area corresponding to the location information is one of a plurality of areas divided in advance on the game scene map; and with the area corresponding to the location information taken as a hot spot area, displaying the hot spot area on the game scene map in the game interface in a display mode of heat map.

In some examples, on the game scene map in the game interface, color brightness of the hot spot area is related to the number of second virtual objects with the current suspicion value satisfying the first sub-target threshold range in the hot spot area.

In some examples, if the current sub-target threshold range is a second sub-target threshold range, with a minimum value in the second sub-target threshold range being greater than a maximum value in the first sub-target threshold range, the step of displaying the mark corresponding to the location information on the game scene map in the game interface in a display mode corresponding to the current sub-target threshold range includes:

displaying the mark corresponding to the location information on the game scene map in the game interface in a display mode of location identifier.

In some examples, displaying the mark corresponding to the location information on the game scene map in the game interface in a display mode of location identifier includes:

determining a position point corresponding to the location information on the game scene map; and displaying the position point corresponding to the location information on the game scene map in the game interface in the display mode of location identifier.

In some examples, the location identifier includes an arrow, and the arrow points to a direction consistent with orientation of the second virtual object.

Reference may be made to the above method embodiments for specific implementation modes of the steps of the game display method in the present embodiment, which is not repeated herein.

The electronic equipment provided in the present disclosure, by updating the current suspicion value of at least one second virtual object in response to the preset game event, and acquiring the location information of the second virtual object with the current suspicion value satisfying the target threshold range in the game scene, so as to display the mark corresponding to the location information on the game scene map in the game interface corresponding to the first virtual object, provides the defending party player with a way of viewing the position of the attacking party player through the map, which is beneficial to improving the game experience of the defending party player, and also facilitates improving the game competitiveness and the degree of game participation of the players.

An embodiment of the present disclosure further provides a computer-readable storage medium, where the storage medium stores a computer program, and when the computer program is executed by a processor, steps of the method provided in the preceding embodiments are executed: displaying a game interface corresponding to a first virtual object;

in response to a preset game event, acquiring clue information of a second virtual object in a game scene, and updating a current suspicion value of at least one second virtual object, where the clue information is information generated in response to a first target interactive operation performed by the second virtual object on a target object in the game scene, and the target object is at least one of: the second virtual object, a non-player character, and a virtual article in the game scene;

acquiring location information of the second virtual object with the current suspicion value satisfying a target threshold range in the game scene; and displaying a mark corresponding to the location information on a game scene map in the game interface.

In some examples, before the step of acquiring location information of the second virtual object with the current suspicion value satisfying a target threshold range in the game scene, the method further includes: determining the target threshold range to be satisfied by the current suspicion value; and the step of displaying a mark corresponding to the location information on a game scene map in the game interface is:

displaying the mark corresponding to the location information on the game scene map in the game interface in a display mode corresponding to the target threshold range.

In some examples, the target threshold range includes at least two sub-target threshold ranges, and the method includes: determining a current sub-target threshold range where the current suspicion value is located; and the step of displaying the mark corresponding to the location information on the game scene map in the game interface in a display mode corresponding to the target threshold range includes: displaying the mark corresponding to the location information on the game scene map in the game interface in a display mode corresponding to the current sub-target threshold range.

In some examples, if the current sub-target threshold range is a first sub-target threshold range, the step of displaying the mark corresponding to the location information on the game scene map in the game interface in a display mode corresponding to the current sub-target threshold range includes:

displaying the mark corresponding to the location information on the game scene map in the game interface in a display mode of heat map.

In some examples, displaying the mark corresponding to the location information on the game scene map in the game interface in a display mode of heat map includes:

determining an area corresponding to the location information on the game scene map, where the area corresponding to the location information is one of a plurality of areas divided in advance on the game scene map; and with the area corresponding to the location information taken as a hot spot area, displaying the hot spot area on the game scene map in the game interface in a display mode of heat map.

In some examples, on the game scene map in the game interface, color brightness of the hot spot area is related to the number of second virtual objects with the current suspicion value satisfying the first sub-target threshold range in the hot spot area.

In some examples, if the current sub-target threshold range is a second sub-target threshold range, with a minimum value in the second sub-target threshold range being greater than a maximum value in the first sub-target threshold range, the step of displaying the mark corresponding to the location information on the game scene map in the game interface in a display mode corresponding to the current sub-target threshold range includes:

displaying the mark corresponding to the location information on the game scene map in the game interface in a display mode of location identifier.

In some examples, displaying the mark corresponding to the location information on the game scene map in the game interface in a display mode of location identifier includes:

determining a position point corresponding to the location information on the game scene map; and displaying the position point corresponding to the location information on the game scene map in the game interface in the display mode of location identifier.

In some examples, the location identifier includes an arrow, and the arrow points to a direction consistent with orientation of the second virtual object.

Reference may be made to the above method embodiments for specific implementation modes of the steps of the game display method in the present embodiment, which is not repeated herein.

The storage medium provided in the present disclosure, by updating the current suspicion value of at least one second virtual object in response to the preset game event, and acquiring the location information of the second virtual object with the current suspicion value satisfying the target threshold range in the game scene, so as to display the mark corresponding to the location information on the game scene map in the game interface corresponding to the first virtual object, provides the defending party player with a way of viewing the position of the attacking party player through the map, which is beneficial to improving the game experience of the defending party player, and also facilitates improving the game competitiveness and the degree of game participation of the players.

In the several embodiments provided in the present disclosure, it should be understood that the device and the method disclosed may be implemented in other manners. For example, the device embodiment described in the above is merely exemplary, for example, the units are merely divided according to logical functions, but they may be divided in other manners in practical, for example, multiple units or components may be combined or may be integrated into another system, or some features may be omitted, or not executed. In addition, the mutual coupling, or direct coupling or communication connection illustrated or discussed may be implemented via indirect coupling or communication connection between some interfaces, devices, or units, which may be electronic, mechanical, or in other forms.

The said units described as separate parts may be or also may not be physically separated, the parts displayed as units may be or also may not be physical units, i.e., they may be located at one place, or also may be distributed on a plurality of network units. The objective of the solution of the present embodiment may be realized by selecting part or all of the units thereof as actually required.

Besides, various functional units in various embodiments of the present disclosure may be integrated into one processing unit, or each unit also may exist in a physically independent way, and two or more than two units also may be integrated into one unit. The above integrated unit may be implemented in the form of hardware, or in the form of hardware plus a software functional unit.

The above integrated unit implemented in a form of software functional unit may be stored in one computer-readable storage medium. The above software functional unit is stored in one storage medium, including several instructions used to make one computer device (which may be a personal computer, a sever or a network device etc.) or a processor execute some of the steps of the methods of various embodiments of the present disclosure. The aforementioned storage medium includes: U disk, mobile hard disk, read-only memory (ROM for short), random access memory (RAM for short), magnetic disk or optical disk and various medium that may store program codes.

What is claimed is:

1. A game display method, comprising:

displaying, by a terminal, a game interface corresponding to a first virtual object, wherein a game comprises a game scene, and the first virtual object having a first identity and at least one second virtual object having a second identity that are located in the game scene, the first virtual object and the at least one second virtual object are located in a same match, the second identity is an identity opposite to the first identity;

acquiring, in response to a preset game event, clue information related to the second virtual object in the game scene, and updating a current suspicion value of the at least one second virtual object, wherein the clue information is information generated in response to a first target interactive operation performed by the second virtual object on a target object in the game scene, and the target object is at least one of: the second virtual object, a non-player character, and a virtual article in the game scene;

acquiring location information of the second virtual object with the current suspicion value satisfying a target threshold range in the game scene; and displaying a mark corresponding to the location information on a game scene map in the game interface.

2. The method according to claim 1, further comprising: determining the target threshold range to be satisfied by the current suspicion value, wherein the displaying a mark corresponding to the location information on a game scene map in the game interface comprises:

displaying the mark corresponding to the location information on the game scene map in the game interface in a display mode corresponding to the target threshold range.

3. The method according to claim 2, wherein the target threshold range comprises at least two sub-target threshold ranges, and the method comprises:

determining a current sub-target threshold range where the current suspicion value is located; and wherein the displaying the mark corresponding to the location information on the game scene map in the game interface in a display mode corresponding to the target threshold range comprises: displaying the mark corresponding to the location information on the game scene map in the game interface in a display mode corresponding to the current sub- target threshold range.

4. The method according to claim 3, wherein in response to determining that the current sub-target threshold range is a first sub-target threshold range, the displaying the mark corresponding to the location information on the game scene map in the game interface in a display mode corresponding to the current sub-target threshold range comprises:

displaying the mark corresponding to the location information on the game scene map in the game interface in a display mode of a heat map.

5. The method according to claim 4, wherein the displaying the mark corresponding to the location information on the game scene map in the game interface in a display mode of a heat map comprises:

determining an area corresponding to the location information on the game scene map, wherein the area corresponding to the location information is one of a plurality of areas divided in advance on the game scene map; and displaying a hot spot area on the game scene map in the game interface in the display mode of the heat map, wherein the hot spot area is the area corresponding to the location information.

6. The method according to claim 5, wherein on the game scene map in the game interface, a color brightness of the hot spot area is related to number of second virtual objects with the current suspicion value satisfying the first sub-target threshold range in the hot spot area.

7. The method according to claim 4, wherein in response to determining that the current sub-target threshold range is a second sub-target threshold range, with a minimum value in the second sub-target threshold range being greater than a maximum value in the first sub-target threshold range, the displaying the mark corresponding to the location information on the game scene map in the game interface in a display mode corresponding to the current sub-target threshold range comprises:

displaying the mark corresponding to the location information on the game scene map in the game interface in a display mode of a location identifier.

8. The method according to claim 7, wherein the displaying the mark corresponding to the location information on the game scene map in the game interface in a display mode of a location identifier comprises:

determining a position point corresponding to the location information on the game scene map; and displaying the position point corresponding to the location information on the game scene map in the game interface in the display mode of the location identifier.

9. The method according to claim 8, wherein the location identifier comprises an arrow, and the arrow points to a direction consistent with an orientation of the second virtual object.

10. The method according to claim 7, wherein a display mode corresponding to the first sub-target threshold range is that only a mark obscurely corresponding to the location information is displayed on the game scene map in the game interface.

11. The method according to claim 7, wherein a display mode corresponding to the second sub-target threshold range is that a mark accurately corresponding to the location information is displayed on the game scene map in the game interface.

12. The method according to claim 6, wherein a digit configured to indicate the number of second virtual objects with the current suspicion value satisfying the first sub-target threshold range in the hot spot area is labelled on the hot spot area.

13. The method according to claim 1, wherein the game interface includes a plurality of operation controls configured for a player controlling acts of the first virtual object in the game.

14. The method according to claim 13, wherein the operation controls comprise a move operation control, a jump operation control, a skill operation control, an attack operation control, a defense operation control and a clue collecting control.

15. The method according to claim 1, wherein the preset game event is that the first virtual object controlled by a current client performs a preset act operation on the target object in the game scene.

16. The method according to claim 15, wherein the preset act operation comprises a rescue operation and a closing operation.

17. The method according to claim 1, wherein the target object further comprises a place where the second virtual object makes an illegal act in the game scene;

and the first target interactive operation is an operation of using a skill.

18. The method according to claim 1, wherein the location information is coordinate information or position point information of the second virtual object in the game scene.

19. An electronic equipment, comprising: a processor, a storage medium, and a bus, wherein the storage medium stores machine-readable instructions executable by the processor, and when the electronic equipment is running, the processor is in communication with the storage medium via the bus, and the processor executes the machine-readable instructions, so as to execute steps of a game display method, wherein the method comprises:

displaying a game interface corresponding to a first virtual object, wherein a game comprises a game scene, and a first the first virtual object having a first identity and at least one second virtual object having a second identity that are located in the game scene, the first virtual object and the at least one second virtual object are located in a same match, the second identity is an identity opposite to the first identity;

acquiring, in response to a preset game event, clue information of the second virtual object in the game scene, and updating a current suspicion value of the at least one second virtual object, wherein the clue information is information generated in response to a first target interactive operation performed by the second virtual object on a target object in the game scene, and the target object is at least one of: the second virtual object, a non- player character, and a virtual article in the game scene;

acquiring location information of the second virtual object with the current suspicion value satisfying a target threshold range in the game scene; and displaying a mark corresponding to the location information on a game scene map in the game interface.

20. A non-transitory computer-readable storage medium, wherein the non-transitory computer-readable storage medium stores a computer program, and when the computer program is executed by a processor, steps of a game display method are executed, wherein the method comprises:

displaying a game interface corresponding to a first virtual object, wherein a game comprises a game scene, and the first virtual object having a first identity and at least one second virtual object having a second identity that are located in the game scene, the first virtual object and the at least one second virtual object are located in the same match, the second identity is an identity opposite to the first identity;

acquiring, in response to a preset game event, clue information of the second virtual object in the game scene, and updating a current suspicion value of the at least one second virtual object, wherein the clue information is information generated in response to a first target interactive operation performed by the second virtual object on a target object in the game scene, and the target object is at least one of: the second virtual object, a non- player character, and a virtual article in the game scene;

acquiring location information of the second virtual object with the current suspicion value satisfying a target threshold range in the game scene; and displaying a mark corresponding to the location information on a game scene map in the game interface.

* * * * *